Oct. 13, 1925.  
W. H. ROBERTSON  
CASH REGISTER  
Filed June 7, 1923   6 Sheets-Sheet 3

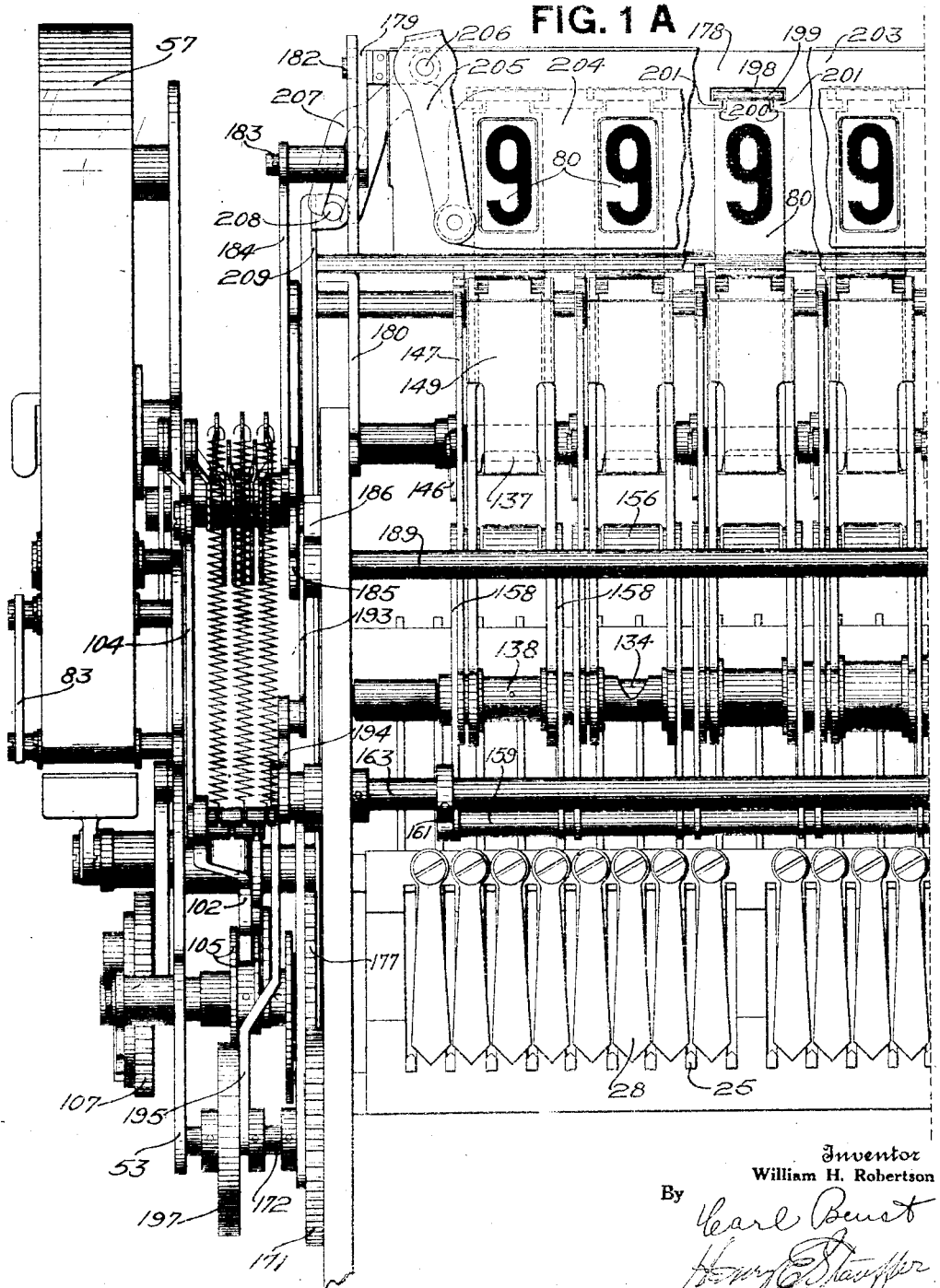

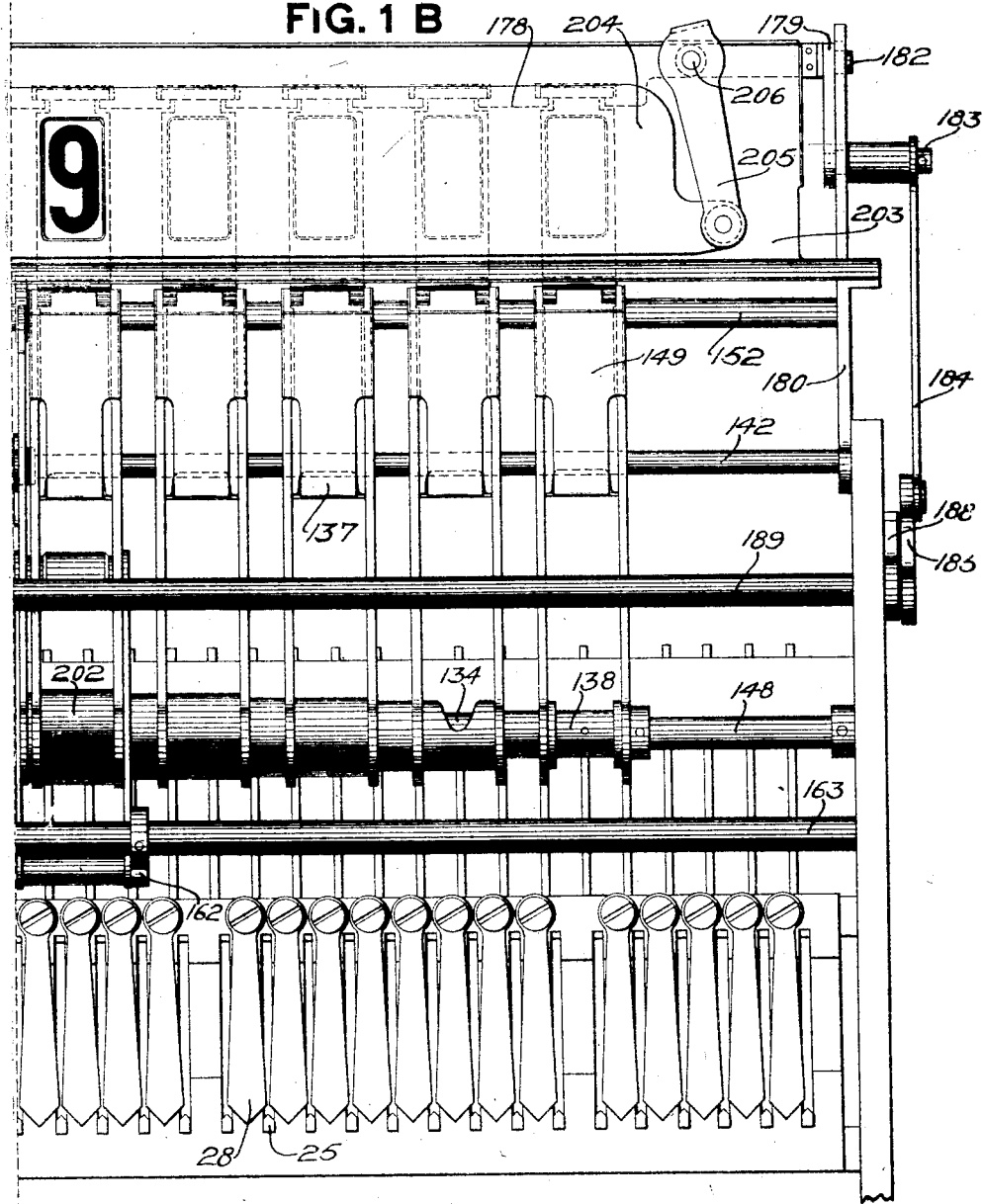

1,556,957

Inventor  
William H. Robertson  
By Carl Benst  
Harry E. Stauffer  
His Attorneys Oct. 13, 1925.  
W. H. ROBERTSON  
CASH REGISTER  
Filed June 7, 1923   6 Sheets-Sheet 4
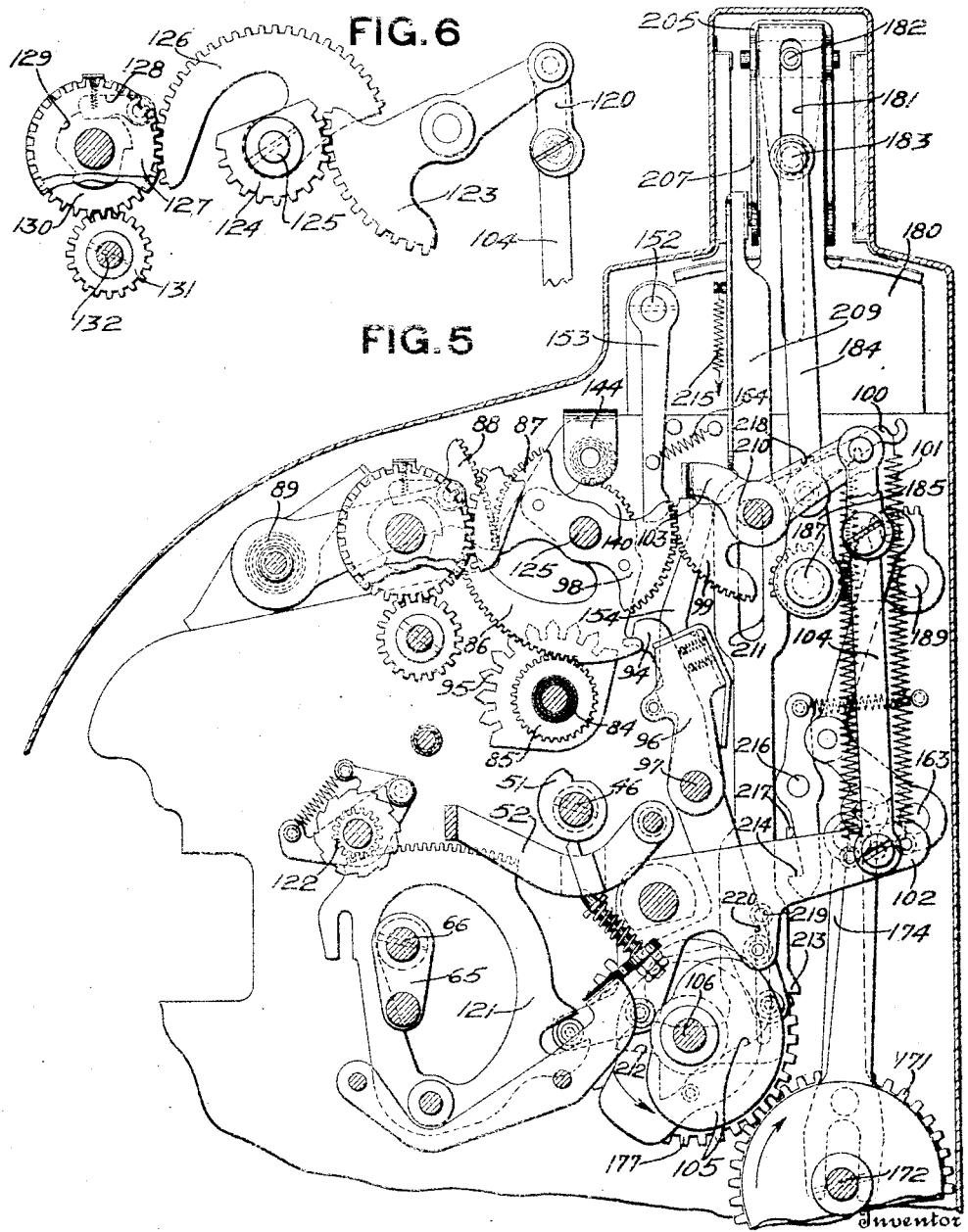
Inventor  
William H. Robertson  
By Carl Beust  
Henry E. Stauffer  
His Attorneys

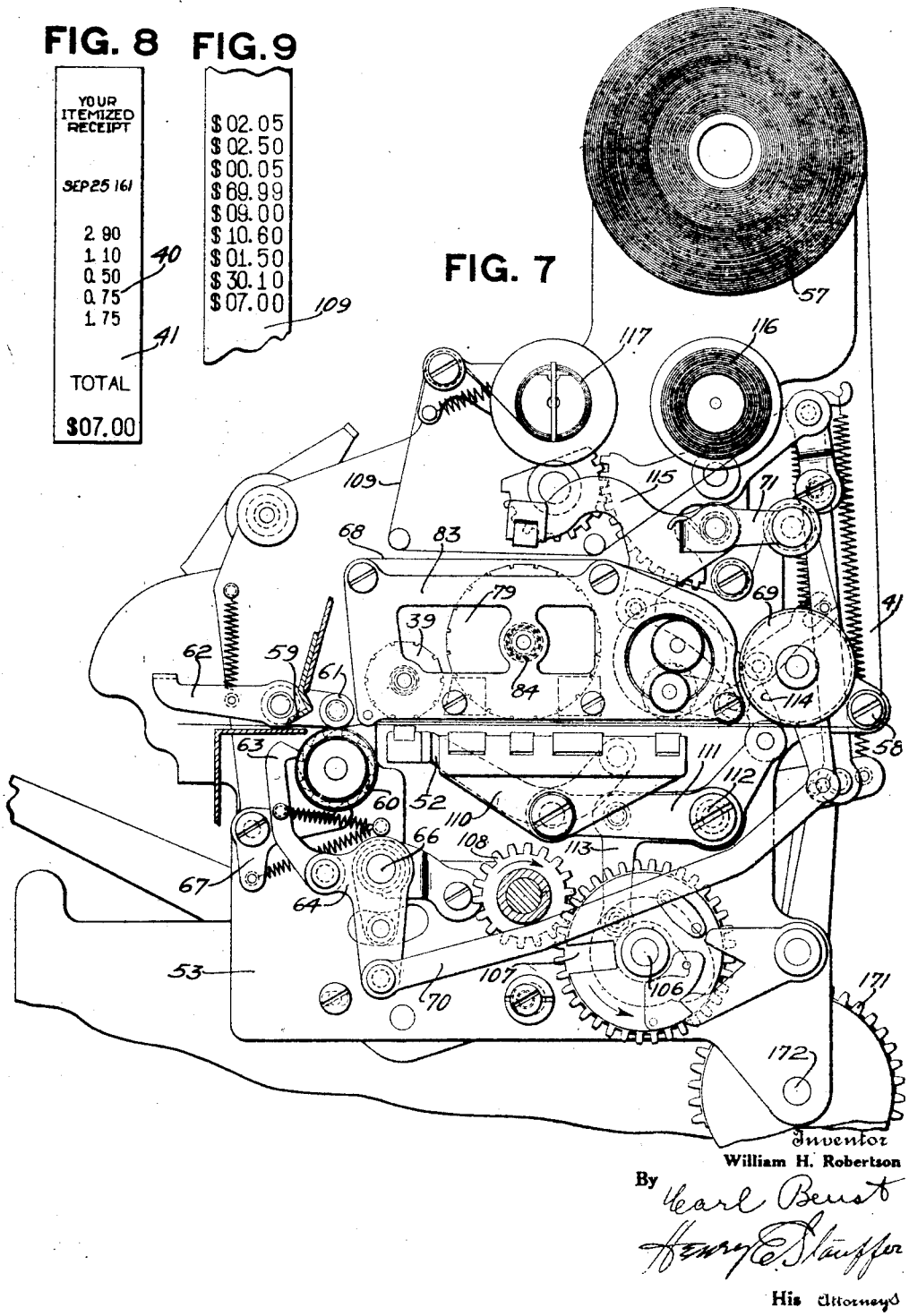

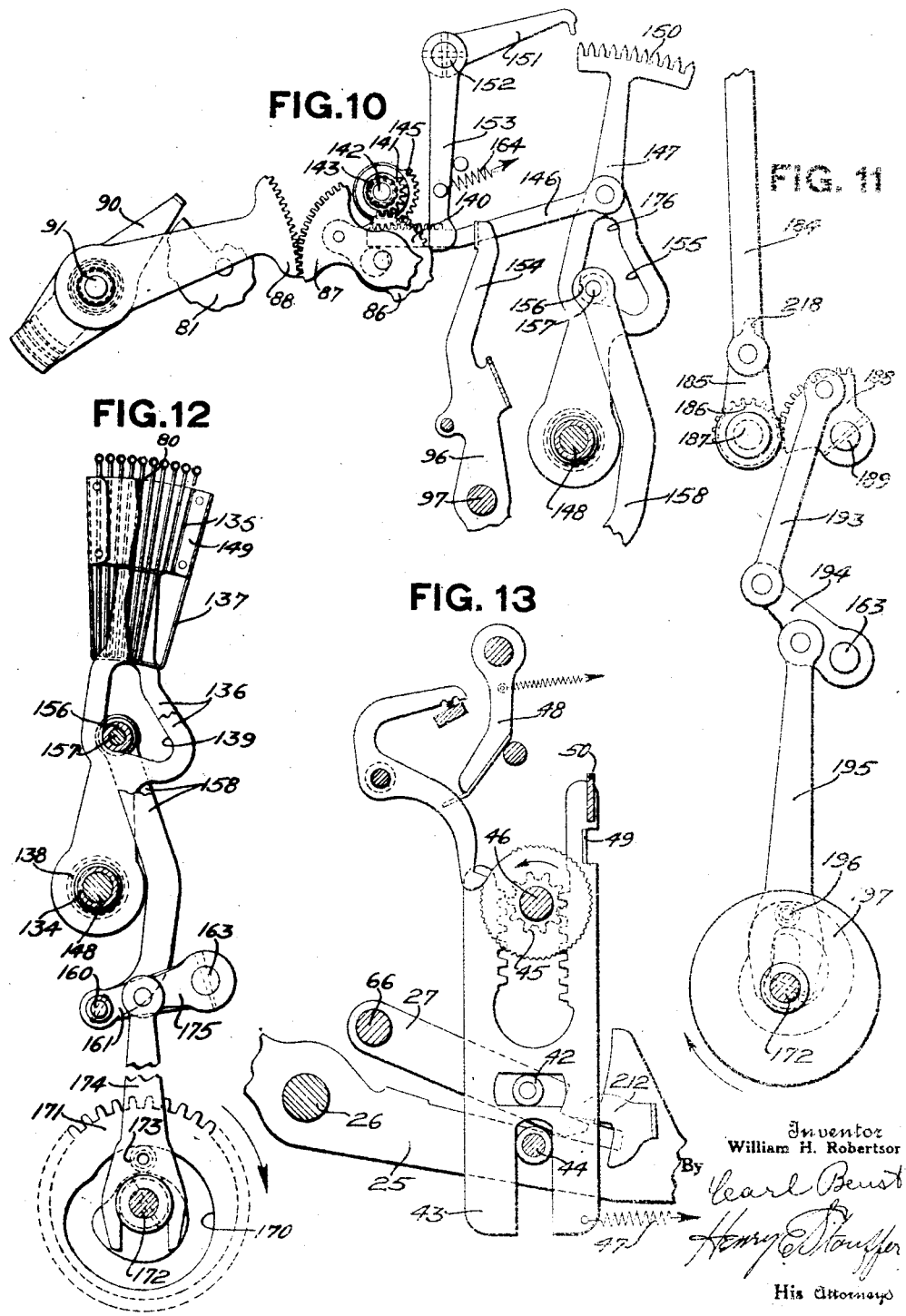

Patented Oct. 13, 1925.

1,556,957

UNITED STATES PATENT OFFICE.

WILLIAM H. ROBERTSON, OF DAYTON, OHIO, ASSIGNOR TO THE NATIONAL CASH REGISTER COMPANY, OF DAYTON, OHIO.

CASH REGISTER.

Application filed June 7, 1923. Serial No. 643,919.

*To all whom it may concern:*

Be it known that I, WILLIAM H. ROBERTSON, a citizen of the United States, residing at Dayton, in the county of Montgomery and State of Ohio, have invented certain new and useful Improvements in Cash Registers, of which I declare the following to be a full, clear, and exact description.

This invention relates to cash registers, and particularly to improvements in the type of machine shown in the Von Pein application for Letters Patent of the United States, Serial No. 293,141, filed April 28, 1919.

One of the objects of this invention is the provision of mechanism for accumulating the items of a transaction, for printing the items and a total of the same, and indicating mechanism for displaying the total both in the front and rear of the machine.

Another object of this invention is the provision of an improved mechanism for obscuring the indicators from view during the operation of the machine.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said drawings:

Figs. 1^A and 1^B together constitute a rear elevation of the machine.

Fig. 5 is a sectional view taken between the printer frame and the side frame of the machine.

Fig. 6 is a detail view of part of the totalizer turn-to-zero mechanism.

Fig. 7 is a side elevation of the printing mechanism.

Fig. 8 is a view of the receipt issued by the printing mechanism of the machine.

Fig. 9 is a view of a portion of the record strip.

Fig. 10 is a detail view of the total indicator selecting mechanism.

Fig. 11 is a detail view of the mechanism for raising and lowering the indicators.

Fig. 12 is a detail view of the mechanism for moving the indicator supporting members into the selected positions.

Fig. 13 is a detail view of the mechanism for imparting movement to the cam shaft.

The embodiment illustrated comprises the usual amount keys, means for entering amounts in a totalizer and for printing the same, and means for printing the total of amounts entered. In addition, mechanism is provided for indicating the total amounts. A flash device which covers the indication while items are being entered by the amount keys is also provided.

Figure 2:
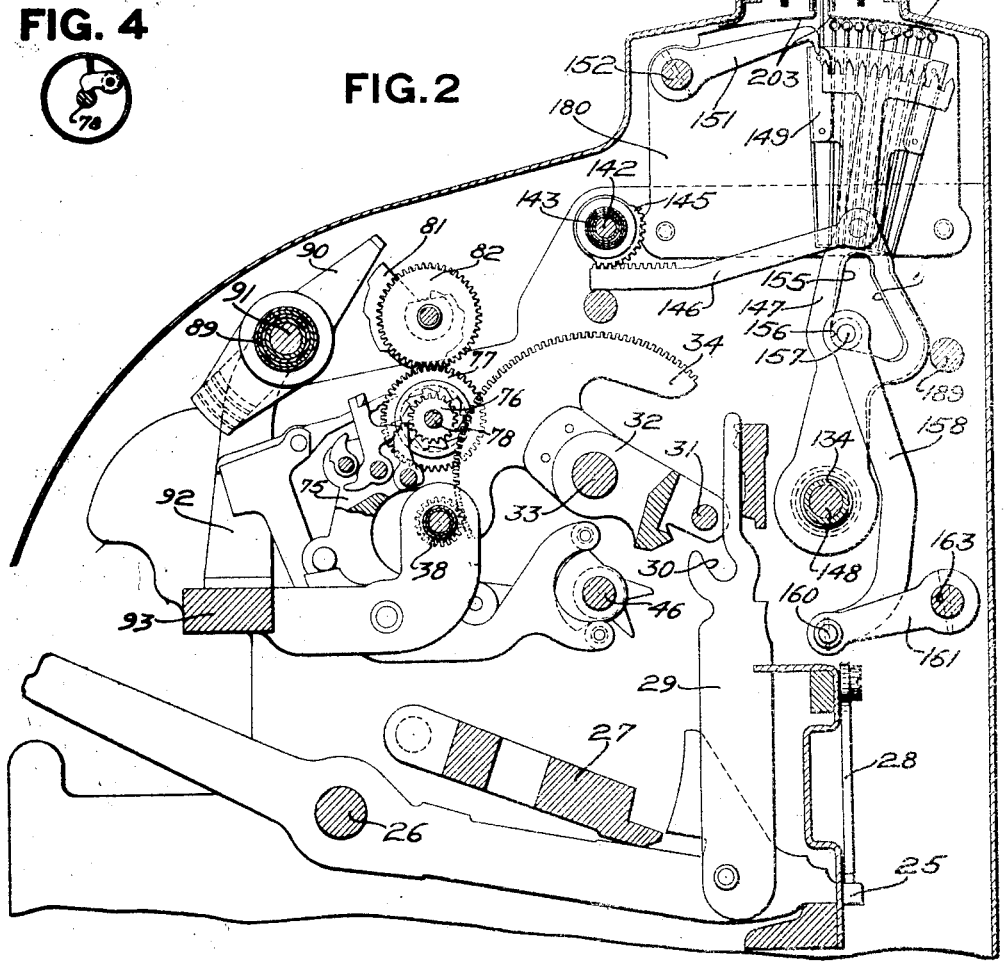
Fig. 2 is a sectional view of the machine taken inside the right hand side frame.

Referring especially to Fig. 2, the invention is shown in connection with the well known lever key type machine. The keys 25 arranged in denominational groups as usual, are pivoted on a transverse rod 26 carried by the side frames of the machine, and at their rear ends are notched to cooperate with a lip on a key coupler 27 for purposes well known in the art.

The rear ends of the keys are extended to cooperate with pivoted key stops 28 which prevent a simultaneous depression of a plurality of keys in single denominational groups.

Uprights 29, connected to the rear ends of the keys, are provided with notches 30 for engaging rods 31 carried by a rocker member 32, supported on a shaft 33. There is a rocker member for each denominational group of keys 25, and each of the members is operatively connected to its registering segment or totalizer actuator 34. The notches in the uprights 29 are located to transmit amounts of movement to the actuators proportionate to the number of units represented by the keys to which the uprights are connected.

The totalizer actuators are normally in mesh with gears 38 which are operatively connected with the item type wheels 39 (Fig. 7) by telescopic sleeves to print the items 40 on the issuing receipt 41 (Fig. 8).

The key coupler 27, before referred to, is pivotally mounted in the side frames and rests upon the rear ends of the keys from which it receives its movement. The right hand end of the key coupler carries a roller 42 (Fig. 13) which cooperates with a slot in a driving member 43 guided on a stud 44 projecting from the frame of the machine. The driving member is provided with opposing racks adapted to be thrown into mesh alternately with a gear 45 on a cam shaft 46 to move the shaft in a counter-clockwise direction. The engagement of the racks with the gear is effected and maintained by a spring 47 and a spring drawn arm 48, and a flange 49 on the rack and a flange 50 on the frame, operating in the usual manner.

The cam shaft 46 (Fig. 5), extends through the right hand side frame. A cam 51, fixed to this shaft, cooperates with a spring-pressed pivoted impression hammer supporting arm 52 which is offset to extend through an opening in a printer frame 53 (Fig. 7) into operative relation with the item type wheels 39. By means of this mechanism the items 40 (Fig. 8) are printed upon the issuing strip 41.

The issuing strip 41 is fed from a supply roll 57 under a guide stud 58, and between the type wheels and the impression platens toward a severing member 59. When each item is printed the issuing strip is fed forward one space by a roller 60 cooperating with a second roller 61 carried on a spring pulled arm 62. The roller 60 is rotated by a pawl 63 engaging a ratchet secured to the roller 60. The pawl 63 is carried on a bell crank arm 64 which is moved by an arm 65 (Fig. 5) secured to the right hand trunnion 66 of the key coupler. The usual spring-actuated pawl 67 (Fig. 7) prevents a retrograde movement of the feeding roller.

An inking ribbon 68 passes between the type carriers and the paper, over the usual guide pins and partly around a feed roller 69 which is rotated by the usual pawl and ratchet device actuated by a link 70 connected to the bell crank arm 64. The ribbon is maintained in a taut condition by a spring tensioned arm 71 carrying a roller around which the ribbon moves.

The amounts represented by the keys depressed are also entered in a totalizer 75 (Fig. 2) which is of a well known type and will be but briefly described.

Figure 4:
Fig. 4 is a detail sectional view of a totalizer wheel taken on the line 4—4 of Fig. 3.

The totalizer elements comprise pinions 76 rigid with the gear wheels 77 and the other necessary elements supported on a turn-to-zero shaft 78. The shaft is provided with a groove to cooperate with spring-pressed pawls (Fig. 4) on the totalizer elements to turn the totalizer to zero in the usual manner.

The totalizer is rocked into mesh with the actuators and transfers are effected by mechanism so well known in this type of machine that it will not be described here.

The amount accumulated on the totalizer is ascertained by a printing and indicating operation. For this purpose, mechanism is provided for setting up total type wheels 79 (Fig. 7) to print the amount in the totalizer and for selecting indicating elements 80 (Figs. 1A and 2) to display the amount in the totalizer. For this purpose, the totalizer also comprises stepped disks 81 (Fig. 2) rigid with gear wheels 82 mounted on a rod in the totalizer frame and meshing with the gears 77 rigid with the totalizer pinions.

The total type wheels 79 (Fig. 7) are located to the right of the printer frame 53, and are suitably supported therein and in a supplemental frame 83. These wheels are connected by a tube line 84 with gears 85 (Fig. 5) in mesh with segment gears 86 rigidly connected with segment gears 87 in mesh with segment gears 88 connected by a tube line 89 (Figs. 2 and 5) with arms 90 to be moved into engagement with the steps on the disks 81 of the totalizer. The tube line is supported by a rod 91 supported in the printer frame and in a bracket 92 mounted on the front cross member 93. The steps on the stepped plates 81 are so located that the type wheels will be set in accordance with the amount in the totalizer when the arms 90 are moved into contact therewith. The total indication is also selected by the stepped plates 81 and will hereinafter be described.

Also integral with the segment gears 87 are other segment gears 98 which mesh with segment gear levers 99 provided with portions 100 supporting the upper ends of tension springs 101 attached to a rocking member 102. The springs are normally restrained against moving the arms 90 and total type wheels by a yoke member 103 connected by a link 104 to said rocking member 102. The member 102 is rocked first clockwise and then counter-clockwise by cams 105 secured on a driving shaft 106 driven by a gear 107 (Fig. 7) in mesh with a gear 108 driven by any suitable means. As the rocking member is moved clockwise the springs 101 are permitted to function to set up the total type wheels in accordance with the amount in the totalizer.

The total type wheels are held in alinement while the impressions are being made, by the usual alining pawls, 94 engaging a notched plate 95 secured to the type wheel gears 85. These pawls are supported in a frame member 96 pivoted on a rod 97 and actuated by a cam on the driving shaft 106.

The driving shaft 106 makes one rotation for each total printing operation, being stopped at the end of the rotation by the usual mechanism.

Impressions from the total type wheels are taken upon the issuing strip 41 before referred to, and also on a total record strip 109 (Fig. 9) which will be described hereinafter. The impressions from the total type wheels, electros and consecutive number wheels are made upon the issuing strip by platens carried by a member 110 pivotally mounted on an arm 111 supported by a screw stud 112. This arm is rigidly connected to lever 113 which has a roller carried on its lower end engaging a cam formed on the gear 107.

The lever 113 has an upwardly and rearwardly extending arm connected by a link 114 to an impression arm 115 to take impressions from the total type wheels upon the total record strip 109 which is fed from a supply roll 116 to a receiving roll 117.

During the total printing operation the issuing strip is fed by a segment plate 121 (Fig. 5) which engages a pinion 122 cooperating with a ratchet and pawl feeding device. This segment plate is actuated by the rocking member 102. By this mechanism the strip is given a greater movement of feed than during item printing.

Figure 3:
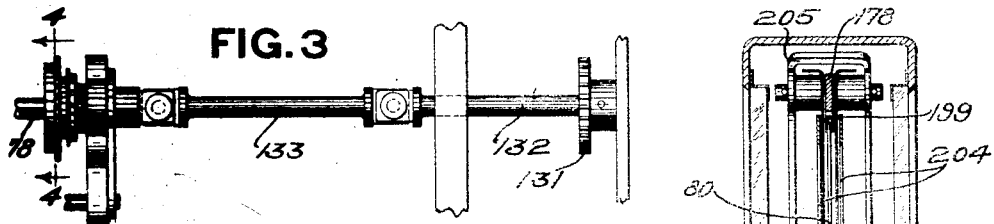
Fig. 3 is a detail view of part of the totalizer turn-to-zero mechanism.

During the total printing operation the totalizer is reset to zero by the actuation of a segment gear lever 123 (Fig. 6) connected to the link 104 by a short link 120. This segment gear lever meshes with a partial gear 124 secured to a shaft 125 which freely supports the segment gears 86, 87 and 98 (Fig. 5). Secured to the shaft on the left side of the printer frame is a segment gear 126 (Fig. 6) which meshes with a gear 127 carrying a spring-pressed pawl 128 cooperating with a ratchet 129 integral with a gear 130 in mesh with a gear 131. The gear 131 is mounted on a shaft 132 connected by a universal short shaft coupling 133 (Fig. 3) with the turn-to-zero shaft 78 of the totalizer. By means of this mechanism the totalizer is turned to zero during the latter part of the total printing and indicating operation.

The amount accumulated in the totalizer is indicated at the time the total is printed and the indicators are adjusted from the totalizer elements by the same mechanism that adjusts the total type printing wheels previously described.

Integral with the segment gears 86 (Figs. 5 and 10) are segment gears 140 which mesh with segment gears 141 secured to the right hand ends of a rod 142 and telescopic tubes 143 supported by the side frames of the machine and a bracket 144. Also secured to the rod and tubes are segment gears 145 which mesh with racks 146 having one end pivoted to rocking members 147 which are freely mounted on a rod 148 and telescopic tubes surrounding this rod. These rocking members will be moved to positions corresponding to the amount in the totalizer when the arms 90 are moved into contact therewith.

The rocking members 147 are retained in adjusted position until an indicator-supporting member 149 (Fig. 12) is moved into a corresponding position and an indicator plate 80 engaged with an elevating mechanism. Formed in the upper edges of the rocking members 147 are notches 150 corresponding in number to the steps on the plates 81 of the totalizer. Arms 151 secured to a rod 152 are rocked into engagement with the notches 150 by a downwardly extending arm 153 (Fig. 10) actuated by an upwardly extending arm 154 integral with the total type wheel alining pawl frame 96. This arm is normally retained in disengaged position by a spring 164.

For each group of item entering keys 25 there are a corresponding number of indicator plates 80 supported by the indicator supporting member 149 (Figs. 2 and 12). These plates slide in grooves 135 uniformly spaced and radially arranged in the side plates 136 of the rocking member. There are two side plates for each group of indicator tablets, fastened together at their upper ends by a formed yoke 137 upon which the indicator tablets rest in their normal position. The lower ends of the side plates are secured to opposite ends of flanged hubs 138 which are secured to telescopic sleeves supported by the rod 148.

The rocking members supporting the indicator tablets are moved into position by rollers 156 cooperating with the walls of openings 139 formed in the side plates 136 and similarly shaped openings 155 in the rocking members 147 (Fig. 10). These rollers 156 are freely mounted upon rods 157 supported by two arms 158 which are secured to sleeves 159 (Fig. 1ᴬ) freely mounted on a rod 160 (Fig. 12) supported by an arm 161 (Fig. 1ᴬ) and a second arm 162. These arms are secured to a rod 163 which is supported at each end by the frames of the machine.

The rod 163 (Fig. 12) is rocked first clockwise and then counter-clockwise by a cam 170 formed in the side of a gear 171 secured to a shaft 172. Cooperating with the cam 170 is a roller 173 carried by the lower end of a pitman 174, the upper end of which is pivoted to an arm 175 secured to the rod 163.

The clockwise movement of the rod 163 will elevate the rollers 156 (Figs. 10 and 12), which, being mounted in the pivoted arms 158, will follow the opening 155 in the rocking member 147 to the narrow portion 176. This rocking member being held rigid at the time by the arm 151 will guide roller 156 to cause the rocking member 149 (Fig. 12) which supports the indicator tablets to move into transverse alinement with the rocking member 147 and place the indicator tablet 80 corresponding to the step on the disk in the totalizer in a position to be elevated to the display position.

The shaft 172 is given a complete revolution during the total printing operation by the gear 171 which is in mesh with a gear 177 (Fig. 5) secured to the driving shaft 106.

The means provided for elevating the indicator tablets 80 to the display position consists of a horizontal bar 178 (Figs. 1ᴬ, 1ᴮ and 2) extending across the top of the machine and secured to vertical plates 179 at each end. These plates are guided in their operation by brackets 180 (Figs. 1ᴬ, 1ᴮ and 5), secured to the side frames of the machine. Each bracket is provided with vertical openings 181 in which move rollers 182 and studs 183 mounted on the plates 179. The horizontal bar 178 and plates 179 are given a reciprocal motion by links 184 connecting the studs 183 with arms 185 (Fig. 11) which are integral with segment gears 186 freely mounted on studs 187 supported in the side frames of the machine. The segment gears 186 mesh with segment gears 188 which are secured to a rod 189 supported by the side frames of the machine.

The rod 189 is oscillated by a link 193 (Fig. 1ᴬ and 11) connecting the segment gear 188 with an arm 194 freely mounted on the rod 163. This arm is rocked by a pitman 195 carrying a roll 196 engaging a cam 197 secured to the shaft 172. The cam is formed so as to move the horizontal bar 178 downward to place the last indicators displayed in their normal position before the indicator supporting member is moved to the new position, corresponding to the amount in the totalizer. After the indicator supporting members assume their new positions the horizontal bar is returned to its upper or normal position, displaying the new indication.

The lower edge of the horizontal bar 178 (Figs. 1ᴬ and 2) has a plurality of slotted openings 198 through which the tops 199 of the indicator tablets 80 pass as the indicator supporting members 149 are rocked. Notches 200 formed on opposite sides of the indicator tablets engage horizontal lugs 201 on the bar 178 to move the indicator tablets into and out of their displaying position.

The indicator tablets are arranged to indicate toward the front and the rear of the machine. The indicator tablets in the first group on the left in Fig. 1ᴮ, which is the center group, are provided with characters on both sides and indicate both to the front and the rear. The other groups of indicator tablets in Fig. 1ᴮ are seen only from the front of the machine, and their supporting members 149 are moved in unison with the supporting members 149 (Fig. 1ᴬ) for the rear indicator tablets. The first supporting member on the left in Fig. 1ᴬ and the last one to the right in Fig. 1ᴮ are secured to hubs 138 which are pinned to the rod 148. The other three supporting members in Fig. 1ᴬ, and the second, third and fourth from the right in Fig. 1ᴮ, are secured to similar hubs which are fastened to telescopic tubes 134 surrounding the rod 148. The first supporting member on the left in Fig. 1ᴮ is secured to a hub 202 which is loosely mounted on the largest telescopic tube 134.

The indicators are displayed through openings in plates 203 supported by the brackets 180. Upon the operation of an item key 25 the indicators displayed by the last total printing operation will be obscured by horizontally moving plates 204 supported on swinging yokes 205 placed at each side of the machine. These yokes are freely mounted on stubs 206 secured in the plates 203. The obscuring plates are moved by means of a bifurcated arm 207 (Fig. 1ᴬ), integral with the yoke 205, and engaging a pin 208 secured in the upper end of a vertically moving plate 209 which is supported on and guided by stubs 210 and 219 (Fig. 5) mounted in the side frame of the machine and in engagement with openings 211 and 220 respectively. The lower end of the plate 209 is formed with an angular projection 212 (Figs. 5 and 13) which is offset to extend inside the frame to engage the key coupler 27 by means of which it is raised until a shoulder 213 engages a latch 214 to retain the vertical plate in its elevated position until released by the total printing operation, when the plate will be returned by a spring 215. The latch 214 is freely mounted in a stub 216 and normally held against a pin 217 by a spring. The latch is moved counterclockwise to release the plate by a projection 218 on the arm 185 (Figs. 5 and 11) when the arm moves clockwise as hereinbefore described.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

What is claimed is:

1. In a machine of the class described, the combination of a totalizer, means for entering items in said totalizer, an operating device operable only independently of the item entering means, indicating elements, adjustable supporting means for said indicating elements, connections intermediate of the totalizer and said supporting means rendered effective by an operation of the operating device to adjust said supporting means to select indicator elements, corresponding to the amount on the totalizer, and means actuated by said operating device for moving selected indicating elements into displaying position.

2. In a machine of the class described, the combination of a totalizer, means for entering items in said totalizer, an operating device operable only independently of the item entering means, indicating elements, adjustable supporting means for said indicating elements, connections intermediate of the totalizer and said supporting means rendered effective by an operation of the operating device to adjust said supporting means according to the amount on the totalizer, and means comprising a vertically sliding member adapted to engage an indicating element, a connection intermediate said sliding member and a rocking member actuated by a second rocking member with means intermediate of said rocking member and said operating device to move an indicator into a display position.

3. In a machine of the class described, the combination of a totalizer, a plurality of indicators, an oscillating member supporting said indicators in their normal position, means intermediate of said totalizer and said oscillating member for controlling the movement of said oscillating member for selecting indicators, an operating device, means actuated by said operating device for moving said oscillating member, and a vertically sliding member actuated by said operating device to raise and lower selected indicators.

4. In a machine of the class described, the combination of a totalizer, means for entering items in said totalizer, an operating device operable only independently of the item entering means, a plurality of indicators, an adjustable means normally supporting said indicators, means intermediate of the totalizer and the indicator supporting means and cooperating with said operating device for adjusting said indicator supporting means, and means operated by said operating device for elevating a selected indicator into displaying position.

5. In a machine of the class described, the combination of a totalizer, a plurality of indicating elements, a movable member having a plurality of grooves, guiding said indicating elements, a second movable member, means intermediate of said totalizer and said second movable member for differentially moving said second movable member, an operating device, means actuated by said operating device for alining said second movable member, means actuated by said operating device to cooperate with said movable members to move said first movable member to a position corresponding to the position of said second movable member, and means actuated by said operating device for partially removing one of said indicating elements from its guide for display purposes.

6. In a machine of the class described, the combination of a totalizer, means for entering items in said totalizer, an operating device operable only independently of the item entering means, a movable indicator supporting member adapted to support a plurality of indicators in normal position, means intermediate of said totalizer and said indicator supporting member adapted to adjust said supporting member from the totalizer, and means actuated by said operating means for moving one of said indicators with respect to said indicator supporting member for the purpose of display.

7. In a machine of the class described, the combination of a totalizer, means for entering items in said totalizer, an operating device operable only independently of the item entering means, a plurality of indicators, a movable indicator supporting means adapted to be positioned under control of the totalizer, means adapted to raise one of said indicators to a display position, and means operated by said item entering means for obscuring the displayed indicator.

8. In a machine of the class described, the combination of a totalizer, means for entering items in said totalizer, an operating device operable only independently of the item entering means, a plurality of indicators, a movable indicator supporting means adapted to be positioned under control of the totalizer and actuated by the operating means, means adapted to raise one of said indicators to a display position, means operated by said item entering means for obscuring the displayed indicator, and means actuated by said operating device for removing said obscuring means.

9. In a machine of the class described, the combination of a totalizer, means for entering items therein, an operating device operable only independently of said item entering means, a plurality of indicators, movable supporting means for said indicators, and connections intermediate of the totalizer and indicator supporting means adapted to be operated by the operating device to move into displaying position indicators corresponding to the total appearing upon said totalizer.

10. In a machine of the class described, the combination of a totalizer, means for entering items in said totalizer, an operating device operable only independently of the item entering means, indicating elements having a normal position and an operated position, means for supporting said indicating elements in normal position, said means adapted to be differentially adjusted under control of said totalizer, means actuated by said operating means for moving said indicating elements into operated position, means actuated by said item entering means and adapted to be moved horizontally to obscure said indicating elements in operated position, and means actuated by said operating device, to return said obscuring means to normal position.

11. In a machine of the class described, the combination of a totalizer, means for entering items in said totalizer, an operating device operable only independently of the item entering means, indicating elements, adjustable supporting means for said indicating elements, connections intermediate the totalizer and said supporting means rendered effective by an operation of the operating device to adjust said supporting means according to the amount on the totalizer, means for displaying said indicating elements adjusted to display position, and connections intermediate of the totalizer and operating device for resetting the former to zero by operation of the latter.

12. In a machine of the class described, the combination of a totalizer, item entering means for entering items on said totalizer, an operating device operable only independently of said item entering means for indicating totals and inoperable when entering items, and connections intermediate of the totalizer and the indicating means controlled by an operation of the operating device for controlling the adjustment of the indicating means from the totalizer to indicate the total appearing on said totalizer.

13. In a machine of the class described, the combination of a totalizer, a plurality of indicators, a pivoted member supporting said indicators in their normal position, a second pivoted member, means intermediate of said totalizer and said second pivoted member for differentially moving said second pivoted member, an operating device, and means actuated by said operating device and cooperating with said pivoted members to move said first pivoted member to a position corresponding to the position of said second pivoted member.

14. In a machine of the class described, the combination of a totalizer, a plurality of indicators, a movable member supporting said indicators in their normal position, a second movable member, means intermediate of said totalizer and said second movable member for differentially moving said second movable member, an operating device, means actuated by said operating device and cooperating with said movable members to move said first movable member to a position corresponding to the position of said second movable member, and means for alining said second movable member while moving said first movable member.

15. In a machine of the class described, the combination of a totalizer, item entering means for controlling the entry of items therein, an operating device operable only independently of said item entering means, indicating elements, adjustable supporting means for said indicating elements, and normally effective connections intermediate the totalizer and the indicating elements adjustable supporting means and controlled as to operation by the operating device for indicating the total appearing upon said totalizer.

16. In a machine of the class described, the combination of a totalizer, means for entering items in said totalizer, an operating device operable only independently of the item entering means, indicating elements having a normal position and an operated position, means operated by said item entering means for obscuring said indicating elements in operated position, and means actuated by said operating device for returning said obscuring means to normal position.

17. In a machine of the class described, the combination of a totalizer, means for entering items in said totalizer, an operating device operable only independently of the item entering means, a plurality of indicators, an adjustable indicator supporting member, a movable member actuated by means intermediate of said totalizer and said movable member, and means operated by said operating device and cooperating with said movable member to adjust said adjustable indicator supporting member.

18. In a machine of the class described, the combination of a totalizer, means for entering items in said totalizer, an operating device operable only independently of the item entering means, adjustable indicator supporting means, a plurality of indicators, a differentially movable member, means intermediate of said totalizer and said differentially movable member adapted to actuate said member, means controlled by said operating device and adapted to lock said differentially movable member, and means cooperating with said differentially movable member and operated by said operating device for adjusting said adjustable indicator supporting means.

In testimony whereof I affix my signature.

WILLIAM H. ROBERTSON.